(12) United States Patent
Webb et al.

(10) Patent No.: US 7,057,785 B2
(45) Date of Patent: Jun. 6, 2006

(54) OPTICAL REGENERATOR

(75) Inventors: Roderick Peter Webb, Woodbridge (GB); Alistair Poustie, Ipswich (GB); Robert John Manning, Ipswich (GB)

(73) Assignee: Corning Incorporated, Corning, NY (US)

( * ) Notice: Subject to any disclaimer, the term of this patent is extended or adjusted under 35 U.S.C. 154(b) by 264 days.

(21) Appl. No.: 10/608,805

(22) Filed: Jun. 27, 2003

(65) Prior Publication Data

US 2004/0036946 A1    Feb. 26, 2004

(51) Int. Cl.
    G02F 1/03    (2006.01)
(52) U.S. Cl. ........................................ 359/245
(58) Field of Classification Search ................. 359/245
    See application file for complete search history.

(56) References Cited

U.S. PATENT DOCUMENTS

| | | | | |
|---|---|---|---|---|
| 6,067,180 | A |   5/2000 | Roberts ....................... | 398/201 |
| 6,282,007 | B1 * | 8/2001 | Roberts ....................... | 398/155 |
| 6,384,954 | B1 * | 5/2002 | Webb .......................... | 359/245 |
| 6,424,438 | B1 * | 7/2002 | Byun et al. .................. | 359/108 |
| 6,614,582 | B1 * | 9/2003 | Mikkelsen et al. .......... | 359/326 |
| 6,624,929 | B1 * | 9/2003 | Kang et al. .................. | 359/344 |
| 6,832,053 | B1 * | 12/2004 | Leuthold ...................... | 398/175 |
| 6,865,348 | B1 * | 3/2005 | Miyamoto et al. .......... | 398/183 |
| 2001/0028492 | A1 | 10/2001 | Janz et al. ................... | 398/141 |
| 2003/0169473 | A1 * | 9/2003 | Cotter et al. ................. | 359/245 |

FOREIGN PATENT DOCUMENTS

| | | |
|---|---|---|
| EP | 0813097 | 12/1997 |
| GB | 2302225 | 1/1997 |
| WO | 02/32027 | 4/2002 |

OTHER PUBLICATIONS

Lee et al, "*All optical signal regeneration in cascaded Mach-Zehnder interferometer wavelength converter*", pp. 189-194, IEE Proc.-Optoelectron., vol. 148, No. 4, Aug. 2001.

Yamada, et al, "*A Study of All-Optical 2R Regenerator using Semiconductor Optical Amplifiers*", pp. 124-129, paper presented at the conference "NOC 2001", Networks and Optical Communications on Jun. 26, 2001 and included in the conference proceedings published in book form under the title *Long Haul and Access Networks, Optical Metro and WDM*, edited by A. Lord et al IOS Press, Basel, Switzerland, 2001.

* cited by examiner

*Primary Examiner*—Deandra M. Hughes
(74) *Attorney, Agent, or Firm*—Ronald J. Paglierani

(57) ABSTRACT

There is provided a two-stage optical regenerator for regenerating a data signal comprising a series of optical pulses. Each stage of the optical regenerator comprises a modulator for modulating a reference signal with an input signal, and an interferometer for causing the modulated reference signal to interfere with another version of the modulated reference signal delayed by less than one bit period of the data signal to regenerate the input signal. The input signal of the modulator of the first stage of the regenerator comprises the data signal, and the input signal of the modulator of the second stage of the regenerator comprises the output from the first stage of the regenerator. Relative phase offsets are induced at the outputs of the two interferometers of the regenerator to obtain either minimum transmission from each of the interferometers by the maximum power levels of the respective input signals transmitted therethrough, or maximum transmission from the interferometer of the first stage by the maximum power level of the data signal, and minimum transmission from the interferometer of the second stage by the minimum power level of the output from the first stage of the regenerator.

13 Claims, 5 Drawing Sheets

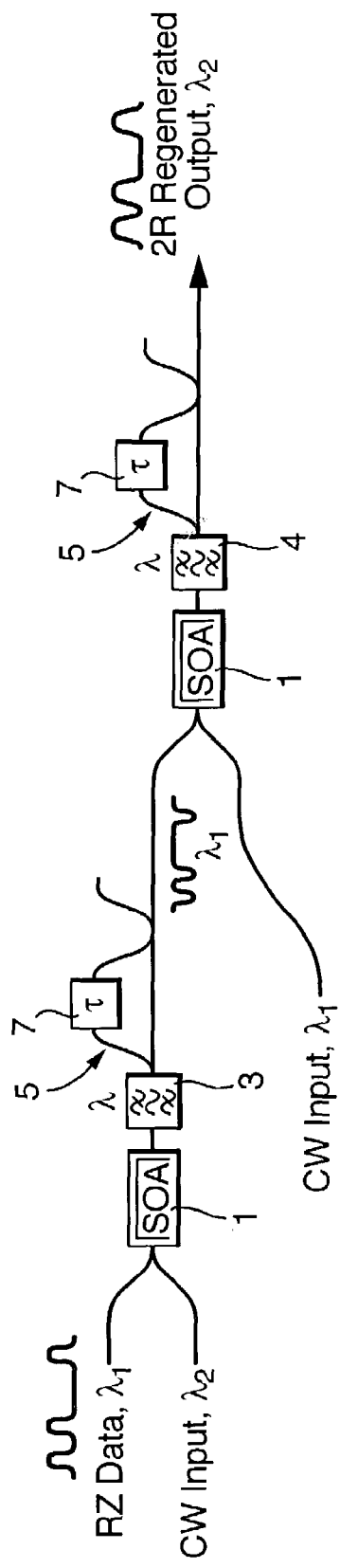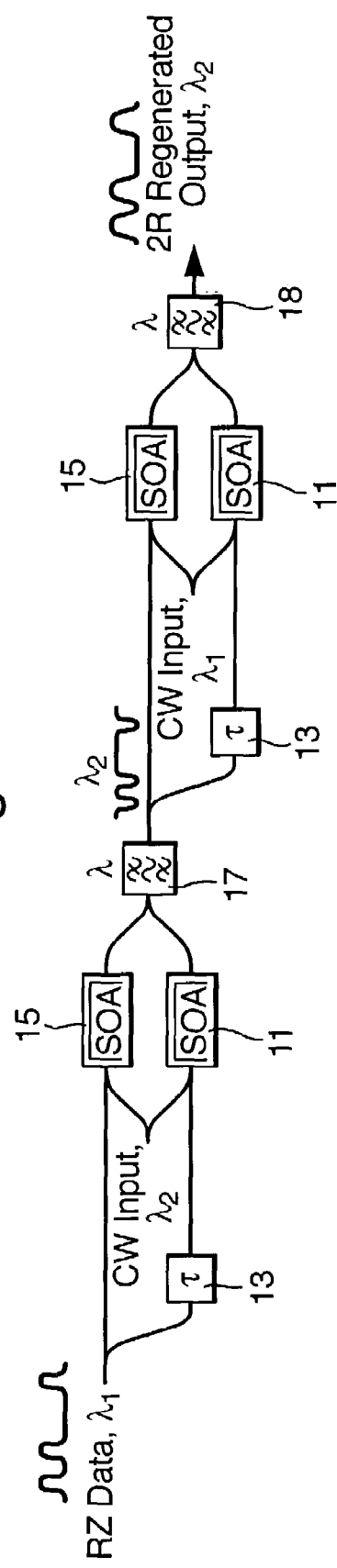

OPTICAL REGENERATOR

CROSS-REFERENCE TO RELATED APPLICATIONS

This application claims the benefit of priority under 35 U.S.C. § 119 of British Application number 0214952.4 filed on 28 Jun. 2002.

BACKGROUND OF THE INVENTION

1. Field of the Invention

This invention is directed to regeneration of optical signals for data communications, in particular though not exclusively optical signals comprising optical return-to-zero (RZ) pulses. It has application to both 2R (re-amplification and re-shaping) and 3R (re-amplification, re-shaping and re-timing) regeneration.

As the capacity of transmission systems increases in response to the increasing demand for communication, the maximum reach of each transmission system is diminished. Regenerators are therefore required at regular intervals along a transmission link in addition to any regenerators associated with network nodes where traffic routing takes place. All-optical wavelength converters with 2R regeneration capabilities, that allow operation at speeds beyond the limits of electronic devices, will be essential in future wavelength division multiplexed (WDM) networks. In particular, of high interest are simple and compact wavelength converters that help to avoid wavelength blocking and ease WDM network management.

2. Technical Background

FIGS. 1 and 2 illustrate a device and method for performing all-optical wavelength conversion and 2R regeneration of multiple data signals comprising a series of optical pulses which does not form part of this invention but is helpful in understanding it. The DISC-type (delayed interference signal-wavelength converter) regenerator shown in FIG. 1 comprises a semiconductor optical amplifier 1 for modulating a continuous wave input with the data signal, and an interferometer 5 having a delay 7 in one arm for causing the modulated continuous wave input to interfere with a delayed copy thereof to regenerate the data signal. The copy of the modulated continuous wave input is delayed by less than one data signal pulse width with respect to the modulated continuous wave input, whereby the pulse width of the regenerated data signal is similar to the pulse width of the input data signal. By reducing the time delay of the copy of the modulated continuous wave input to less than one input optical pulse width, the amplitude of the regenerated data signal is not significantly reduced, and the pulse width of the regenerated data signal can be maintained at close to that of the input data signal. This enables the regenerator to be used in real networks to regenerate broad optical pulses without causing excessive additional broadening of the pulses. This means that several such regenerators may be used to re-amplify and reshape a signal at regular intervals along a transmission path to increase transmission distances between more expensive 3R regenerators.

As each optical pulse of a data signal is transmitted through the semiconductor optical amplifier 1, the relative phase of the continuous wave input transmitted through the amplifier is temporarily altered until the amplifier recovers. Thus, the relative phase at the output from the undelayed arm of the interferometer changes progressively leading to a progressive increase in the non-inverting output level 9 from the interferometer and a corresponding decrease in the inverting output level 11 (depending on the relative phase delay between the two arms) for the duration of the delay. The relative phase at the output from the delayed arm of the interferometer changes progressively after the duration of the delay, reducing the non-inverting output level from the interferometer until the delayed and undelayed parts cancel each other completely. Because the change in phase is progressive, the pulse output by the interferometer is wider than the delay time. If consecutive pulses are transmitted at a faster rate than the recovery rate of the amplifier, the amplifier will not fully recover after each pulse, leading to a reduced phase differential on the modulated continuous wave input corresponding to the difference between the presence and absence of a data pulse.

Optimum operation of a regenerator based on cross-phase modulation in SOAs and an interferometer requires the phase differences between the two arms to be such that the transmission is at a minimum when a data 'zero' level (no pulse) is received and at a maximum when a data 'one' level (pulse) is received (or vice versa for inverting operation). Therefore, ideally, an input pulse should cause a phase change of $\pi$ as illustrated in FIG. 2. At high bit rates, where the period is less than the recovery time, it may not be possible to obtain a full $\pi$ phase change. In this case, adjusting the phase offset in one arm will allow either the 'zero' level or the 'one' level to be at a stationary point of the interferometer transfer characteristic, but not both. Thus, if the phase offset is adjusted such that the 'one' level is at a stationary point of the interferometer transfer characteristic, the non-inverting output levels 9 from the interferometer may consistently achieve their maximum output power corresponding to the data pulses, while returning to a raised level between consecutive pulses because the phase shift induced by the pulses will not have had time to reduce to zero before arrival of the next pulse. Such partial switching allows noise on the 'zero' level at the input to be transferred to the output of the interferometer. It is therefore clear that data signal rates higher than the recovery rate of the amplifier lead to reduced signal to noise ratio of the regenerated data signal. There is therefore a need to provide improved optical signal regeneration at higher data rates.

SUMMARY OF THE INVENTION

According to a first aspect of the invention, there is provided a two-stage optical regenerator for regenerating a data signal comprising a series of optical pulses. Each stage of the optical regenerator comprises a modulator for modulating a reference signal with an input signal, and an interferometer for causing the modulated reference signal to interfere with another version of the modulated reference signal delayed by less than one bit period of the data signal to regenerate the input signal. The input signal of the modulator of the first stage of the regenerator comprises the data signal, and the input signal of the modulator of the second stage of the regenerator comprises the output from the first stage of the regenerator. Relative phase offsets are induced at the outputs of the two interferometers of the regenerator to obtain either minimum transmission from each of the interferometers by the maximum power levels of the respective input signals transmitted therethrough, or maximum transmission from the interferometer of the first stage by the maximum power level of the data signal, and minimum transmission from the interferometer of the second stage by the minimum power level of the output from the first stage of the regenerator.

The inventors have found that by adjusting the interferometers of the regenerator such that relative phase offsets induced at the outputs of the two interferometers provide either minimum transmission from each of the interferometers by the maximum power levels of the respective input signals transmitted therethrough, or maximum transmission from the interferometer of the first stage by the maximum power level of the data signal and minimum transmission from the interferometer of the second stage by the minimum power level of the output from the first stage of the regenerator, the combined performance of the two stages can be better than that of either stage alone. The first stage can be tuned to restore the un-inverted 'ones' by adjusting the relative phase offset such that maximum transmission is induced at the output of the first stage interferometer when the reference signal is modulated by a pulse in the data signal (and so at its maximum power level). In this case, the 'zero' level remains sensitive to variations in the input level, such as noise, so that these variations are transferred to the output. The second stage can then be tuned to restore the 'zeros' by adjusting the relative phase offset such that minimum transmission is induced at the output of the second stage interferometer when the reference signal is modulated by the absence of a pulse in the data signal (and so at its minimum power level).

Alternatively, the first stage can be tuned to restore inverted 'ones' by adjusting the relative phase offset such that minimum transmission is induced at the output of the first stage interferometer when the reference signal is modulated by a pulse in the data signal (and so at its maximum power level). In this case, the pulses are inverted by the first stage interferometer, and the 'zero' level remains sensitive to variations in the input level, such as noise. These variations are transferred to the inverted output of the first stage. The second stage can then be tuned to restore the inverted 'zeros' by adjusting the relative phase offset such that maximum transmission is induced at the output of the second stage interferometer when the reference signal is modulated by the absence of a pulse in the data signal (but at its maximum power level since the signal is inverted), so reverting the output to RZ. The final output from the two-stage regenerator shows reduced variation on both levels.

The first stage of the regenerator may comprise a semiconductor optical amplifier coupled to a Mach-Zehnder interferometer having a relative delay of less than one bit period of the data signal between its arms, the data signal at a first wavelength within the gain band of the semiconductor optical amplifier, and the reference signal comprising a continuous wave at a second wavelength, also within the gain band of the semiconductor optical amplifier, being coupled to the semiconductor optical amplifier.

Alternatively, the first stage of the regenerator may comprise a Mach-Zehnder interferometer having a first semiconductor optical amplifier in one arm, and a second semiconductor optical amplifier in the other arm, the data signal at a first wavelength within the gain band of the semiconductor optical amplifiers being coupled to the first semiconductor optical amplifier and through a delay of less than one bit period of the data signal to the second semiconductor optical amplifier, and the reference signal comprising a continuous wave or clock stream at a second wavelength, also within the gain band of the semiconductor optical amplifiers, being coupled to both arms of the interferometer.

In another alternative, the first stage of the regenerator may comprise a semiconductor optical amplifier coupled in series to a polarisation-dispersive element providing a relative delay of less than one bit period of the data signal between its fast and slow axes, a polarisation controller and a polariser, the data signal at a first wavelength within the gain band of the semiconductor optical amplifier and the reference signal comprising a continuous wave at a second wavelength, also within the gain band of the semiconductor optical amplifier, being coupled to the semiconductor optical amplifier.

The data signal may propagate in the same direction as the reference signal through the semiconductor optical amplifier(s). In this case, a band-pass filter may be used to block transmission of the data signal at the first wavelength out of the regenerator.

Alternatively, the data signal may propagate in the opposite direction to the reference signal through the semiconductor optical amplifier(s).

The second stage of the regenerator may comprise a semiconductor optical amplifier coupled to a Mach-Zehnder interferometer having a relative delay of less than one bit period of the data signal between its arms, the regenerated data signal from the first stage of the regenerator at the second wavelength lying within the gain band of the semiconductor optical amplifier of the second stage, and a reference signal comprising a continuous wave at a third wavelength, also within the gain band of the semiconductor optical amplifier of the second stage, being coupled to the semiconductor optical amplifier of the second stage.

Alternatively, the second stage of the regenerator may comprise a Mach-Zehnder interferometer having a first semiconductor optical amplifier in one arm, and a second semiconductor optical amplifier in the other arm, the regenerated data signal from the first stage of the regenerator at the second wavelength lying within the gain band of the semiconductor optical amplifiers of the second stage being coupled to the first semiconductor optical amplifier of the second stage and through a delay of less than one bit period of the data signal to the second semiconductor optical amplifier of the second stage, and a reference signal comprising a continuous wave or clock stream at a third wavelength, also within the gain band of the semiconductor optical amplifiers of the second stage, being coupled to both arms of the interferometer of the second stage.

In another alternative, the second regenerator may comprise a semiconductor optical amplifier coupled in series to a polarisation-dispersive element providing a relative delay of less than one bit period of the data signal between its fast and slow axes, a polarisation controller and a polariser, the regenerated data signal from the first stage of the regenerator at the second wavelength within the gain band of the semiconductor optical amplifier of the second stage and a reference signal comprising a continuous wave at a third wavelength, also within the gain band of the semiconductor optical amplifier of the second stage, being coupled to the semiconductor optical amplifier of the second stage.

The data signal regenerated by the first stage of the regenerator may propagate in the same direction as the reference signal through the semiconductor optical amplifier(s). In this case, a band-pass filter may be used to block transmission of the data signal regenerated by the first stage of the regenerator at the third wavelength out of the regenerator.

Alternatively, the data signal regenerated by the first stage of the regenerator may propagate in the opposite direction to the reference signal through the semiconductor optical amplifier(s).

Optionally, the third wavelength is the same as the first wavelength. In this way, the regenerated data signal will be output at the same wavelength as the data signal.

According to a second aspect of the invention, there is provided a method of regenerating a data signal comprising a series of optical pulses. The method comprises two stages, each stage comprising the steps of modulating a reference signal with an input signal, and causing the modulated reference signal to interfere with a version of the modulated reference signal delayed by less than one bit period of the data signal to regenerate the input signal. The input signal of the first stage comprises the data signal, and the input signal of the second stage comprises the output from the first stage. Relative phase offsets between the modulated reference signals and delayed versions thereof are adjusted such that either the outputs from both stages are at minimum power levels when the respective input signals are at maximum power levels, or the output from the first stage is at a maximum power level when the data signal is at a maximum power level, and the output from the second stage is at a minimum power level when the output from the first stage is at a minimum power level.

Additional features and advantages of the invention will be set forth in the detailed description which follows, and in part will be readily apparent to those skilled in the art from the description or recognized by practicing the invention as described in the written description and claims hereof, as well as the appended drawings. It is to be understood that both the foregoing description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

BRIEF DESCRIPTION OF THE DRAWINGS

FIG. 3 is a schematic diagram of a two-stage DISC-type regenerator according to the invention;

FIG. 5 is a schematic diagram of an alternative embodiment of a two-stage regenerator according to the invention;

DETAILED DESCRIPTION OF THE PREFERRED EMBODIMENTS

Figure 1:
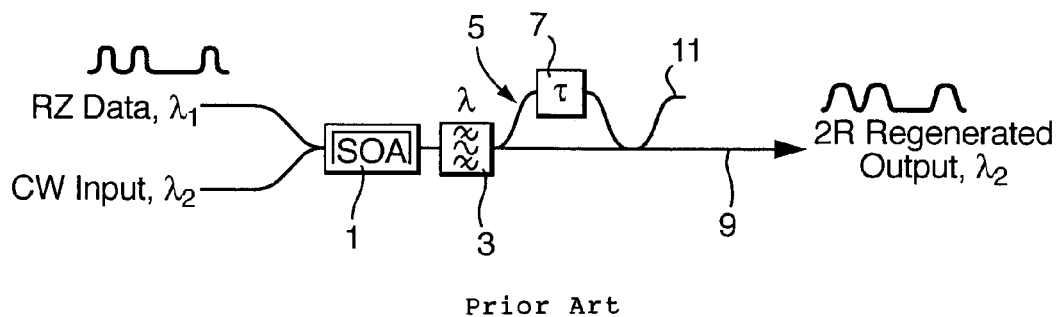
FIG. 1 is a schematic diagram of a DISC-type regenerator as described in co-pending UK Patent Application No. 0128685.5.

FIG. 3 shows a first embodiment of a two-stage optical regenerator according to the invention. The first and second stages of the regenerator comprise first and second DISC-type regenerators respectively, each comprising an SOA 1 followed by a band-pass filter 3, 4 and a Mach-Zehnder interferometer 5 with a delay line 7 in one arm. Each SOA 1 has an active region consisting of InGaAs quantum wells separated by InGaAs barriers (in different proportions) grown on InP. The Mach-Zehnder interferometers 5 and delay lines 7 are fabricated as waveguides on a planar substrate in a conventional manner. The band-pass filter 3 in the first stage is centred on a wavelength of 1547 nm with a full width half-maximum pass band of 2 nm designed to allow transmission of signals at a wavelength $\lambda_2$ while filtering out signals at a wavelength $\lambda_1$ as described below. The band-pass filter 4 in the second stage is centred on a wavelength of 1541 nm with a full width half-maximum pass band of 2 nm designed to allow transmission of signals at a wavelength $\lambda_1$ while filtering out signals at a wavelength $\lambda_2$ as described below. The delay lines 7 introduce a delay time of 6.25 ps to the signals passing through them relative to the signals passing through the other arms of the respective interferometers.

A data signal at a first wavelength $\lambda_1$ is coupled to the SOA 1 of the first stage together with a first reference signal comprising a continuous-wave (CW) at a second wavelength $\lambda_2$. Each pulse of the data signal modulates the phase of the co-propagating reference signal as the data signal and reference signal pass through the SOA 1 of the first stage by cross-phase modulation. The band-pass filter 3 prevents further transmission of the data signal at wavelength $\lambda_1$ while allowing transmission of the phase-modulated reference signal into the Mach-Zehnder interferometer 5. The modulated reference signal is thus split along the two arms of the interferometer 5, with the signal in one arm experiencing a delay with respect that in the other arm by virtue of the delay line 7. The relative phase delay between the arms is adjusted such that minimum transmission is obtained from the 'unswitched' output of the interferometer when the maximum power level of the data signal (ie a pulse) passes through the first stage. Upon recombination, at the output of the Mach-Zehnder interferometer, the two versions of the modulated reference signal therefore interfere to generate an inverted copy of the data signal from the unswitched output. The inverted copy of the data signal is coupled to the SOA 1 of the second stage together with a second co-propagating reference signal at the first wavelength $\lambda_1$. As the signals pass through the SOA 1 of the second stage, the inverted data signal modulates the phase of the co-propagating reference signal by cross-phase modulation. The band-pass filter 4 of the second regenerator prevents further transmission of the inverted data signal at wavelength $\lambda_2$ while allowing transmission of the phase-modulated reference signal into the second Mach-Zehnder interferometer 5. The modulated reference signal is thus split to create two versions of the modulated reference signal travelling along the two arms of the interferometer 5, with the version in one arm experiencing a delay with respect to that in the other arm by virtue of the delay line 7. The relative phase delay between the arms is adjusted such that minimum transmission is obtained from the 'unswitched' output of the interferometer when the maximum power level of the inverted data signal (corresponding to a zero in the data signal) passes through the second stage. Upon recombination, at the output of the Mach-Zehnder interferometer, the two versions of the modulated reference signal interfere to generate an inverted copy of the inverted data signal from the 'unswitched' output.

Figure 4A:
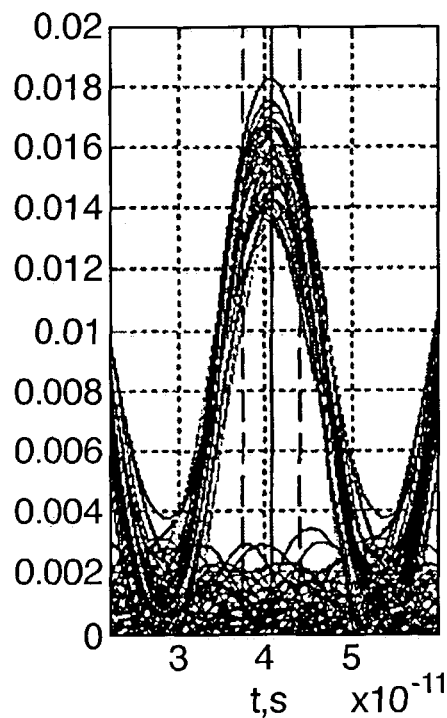
FIGS. 4a to 4c are eye diagrams showing the input data signal, partially regenerated and inverted data signal, and the regenerated data signal respectively from the regenerator of FIG. 3.
Figure 4B:
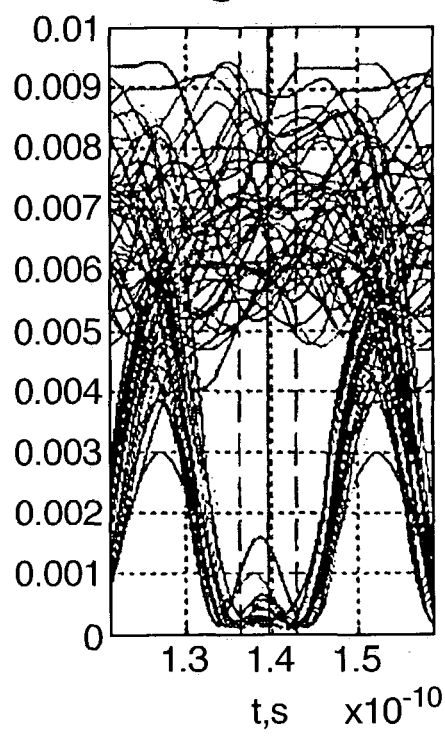

A noisy data signal as shown in FIG. 4a at a wavelength $\lambda_1$ of 1541 nm, which is within the gain band of the SOAs 1, and comprising a series of 40 Gbit/s RZ pulses, was fed to the SOA 1 of the first stage. The noise manifests itself in FIG. 4a in the form of variations in the superimposed maxima and minima levels of the signal. A continuous wave input at a different wavelength $\lambda_2$ of 1547 nm, though also within the gain band of the SOAs 1, and having an amplitude of 10 mW, was made to co-propagate through the SOA 1 of the first stage with the data signal. The partially regenerated and inverted data signal output from the first stage at a wavelength of 1547 nm is shown in the eye diagram in FIG. 4b with the superimposed minima corresponding to the peaks of the pulses of the data signal of FIG. 4a displaying considerably reduced variation. However, the maxima, which correspond to the troughs or zeros between pulses, continue to display significant variation.

Figure 4C:
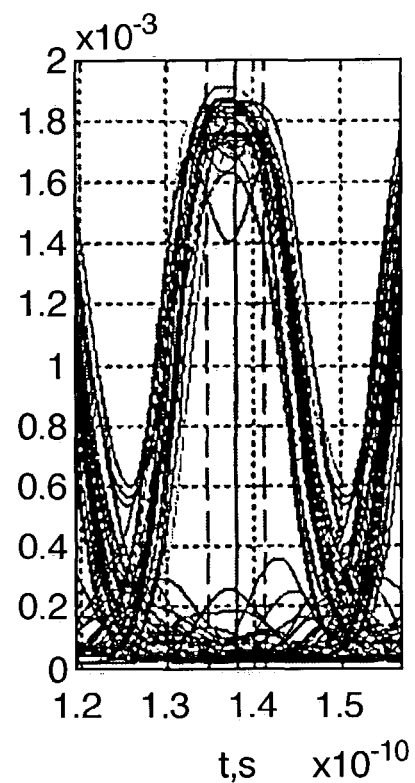

The inverted data signal then passes to the SOA 1 of the second stage. A second continuous wave input at wavelengths $\lambda_1$ of 1541 nm, also within the gain band of the SOA 1, and having an amplitude of 10 mW, was made to co-propagate through the SOA 1 of the second stage with the inverted data signal. The fully regenerated data signal output from the second stage at wavelength $\lambda_1$, comprising an inverted copy of the inverted data signal emanating from the 'unswitched' output, is shown in the eye diagram in FIG. 4c. Compared against the eye diagram of the original data signal as shown in FIG. 4a, the regenerated data signal displays considerably reduced variation both on the superimposed maxima, which correspond to the peaks of the pulses of the data signal, and on the superimposed minima, which correspond to the troughs or zeros between pulses. Hence, it can be seen that the two-stage regenerator has increased the signal to noise ratio of the regenerated data signal.

Figure 2:
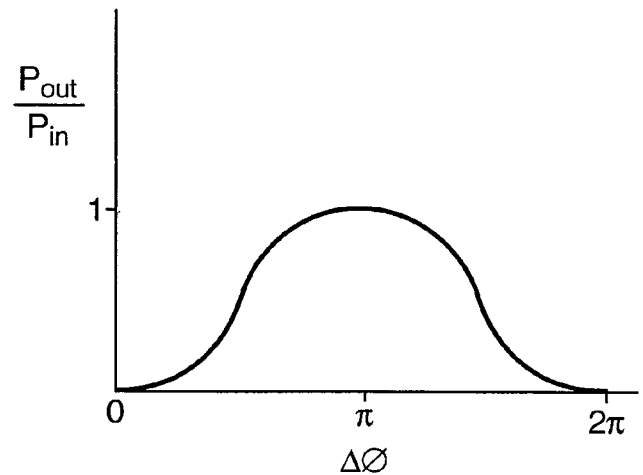
FIG. 2 is a curve showing the relationship between output from an interferometer against relative phase shift between the two arms.

Optimum operation of a regenerator based on cross-phase modulation in SOAs and an interferometer requires the phase differences between the two arms to be such that the transmission is at a minimum when a zero level is received and at a maximum when a one level is received (or vice versa for inverting operation). Therefore, ideally, an input pulse should cause a phase change of $\pi$, with minimum and maximum transmission occurring at a stationary point of the interferometer transfer characteristic, ie where the gradient of the curve of FIG. 2 is zero.

Figure 6A:
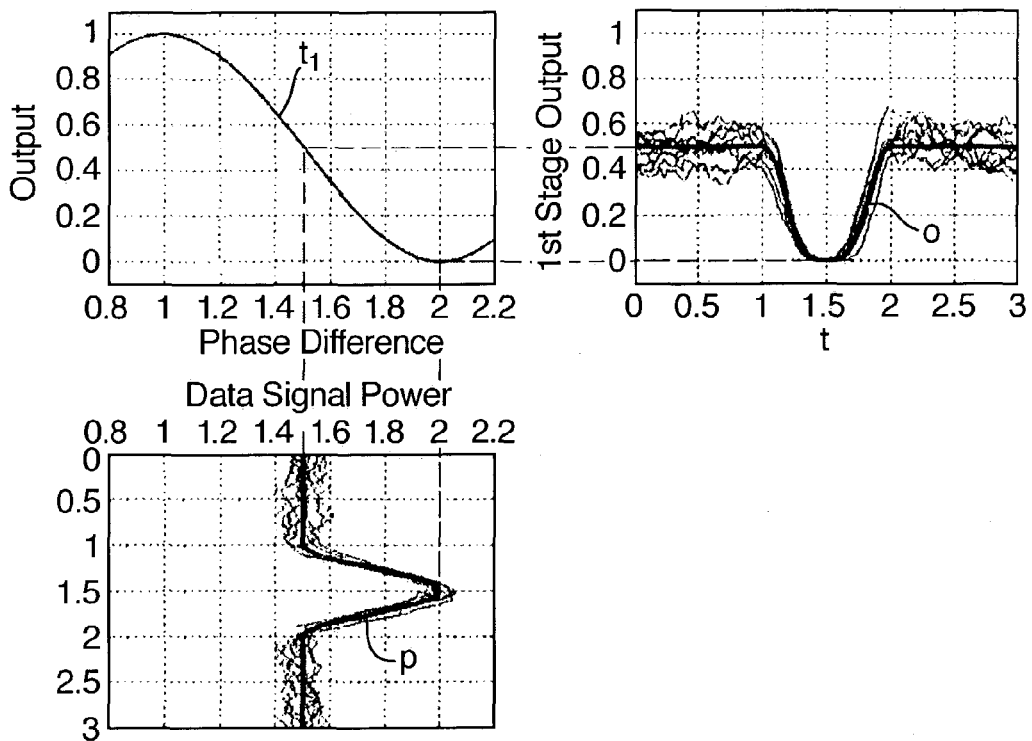
FIGS. 6a and 6b are traces of an input pulse, transfer function and output pulse through respective inverting stages of a regenerator according to the invention.

At high bit rates, where the period is less than the recovery time, it may not be possible to obtain a full $\pi$ phase change. In this case, adjusting the phase offset in one arm will allow either the zero level or the one level to be at a stationary point of the interferometer transfer characteristic, but not both. Noise on the level aligned with a stationary point will be reduced because of the small slope of the transfer characteristic in the region of the stationary point, but the noise on the other level will not. This is illustrated in FIG. 6a, which shows the effect of the first stage on a noisy data signal. A noisy input pulse p induces $\pi/2$ phase difference between the arms of the interferometer due to the transfer function $t_1$. The phase offset is adjusted to zero at the peak of the pulse to obtain minimum transmission through the interferometer, so resulting in inverted operation with the peak of pulse p corresponding to the zero level on the output curve o. The noise on the input 'one' level (pulse maximum on curve p) is reduced at the output o from the first stage because it has been aligned with a stationary point on the interferometer transfer characteristic $t_1$.

Figure 6B:
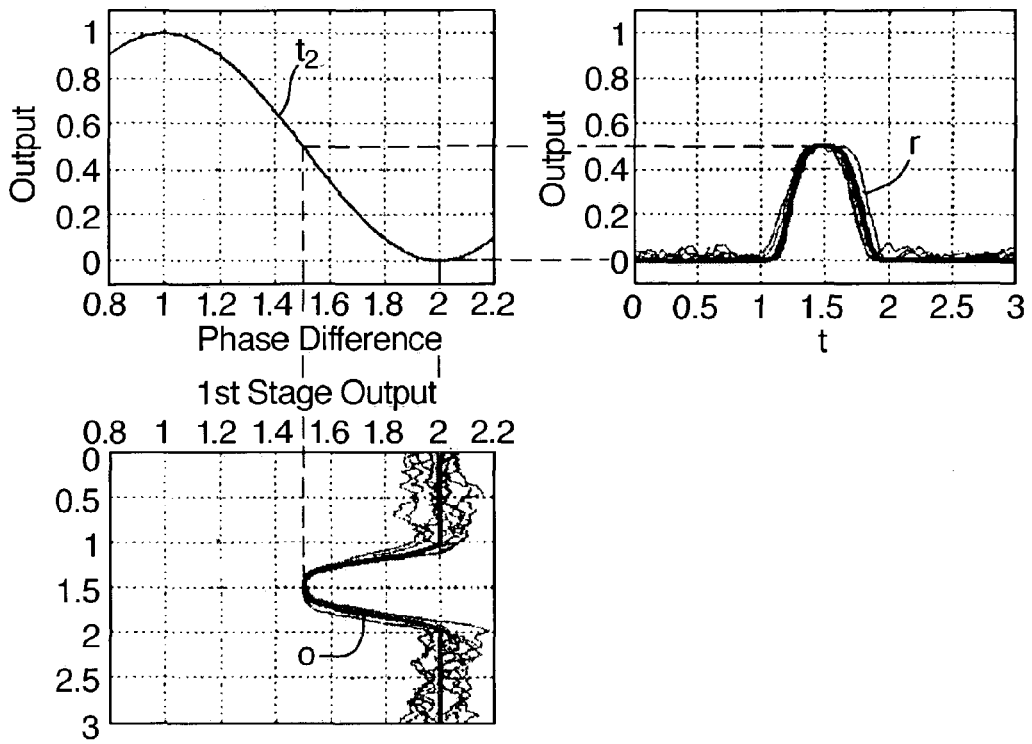

A second stage of regeneration can reduce the noise on the other level and produce a true regenerated output with reduced noise on both levels, as shown by FIG. 6b. The output from the first stage o has noise on the high level, which corresponds to the input zero level (from curve p in FIG. 6a). This level is aligned with a null of the second stage interferometer transfer characteristic $t_2$, so inverting the signal a second time and producing an output r with reduced noise on the input 'zero' level. Thus, a true regenerated output is produced with reduced noise on both levels. Depending on the choice of phase offset, each stage may either invert or not, and either the first stage may reduce the noise on the ones and the second do likewise for the zeros or vice versa.

Figure 6C:
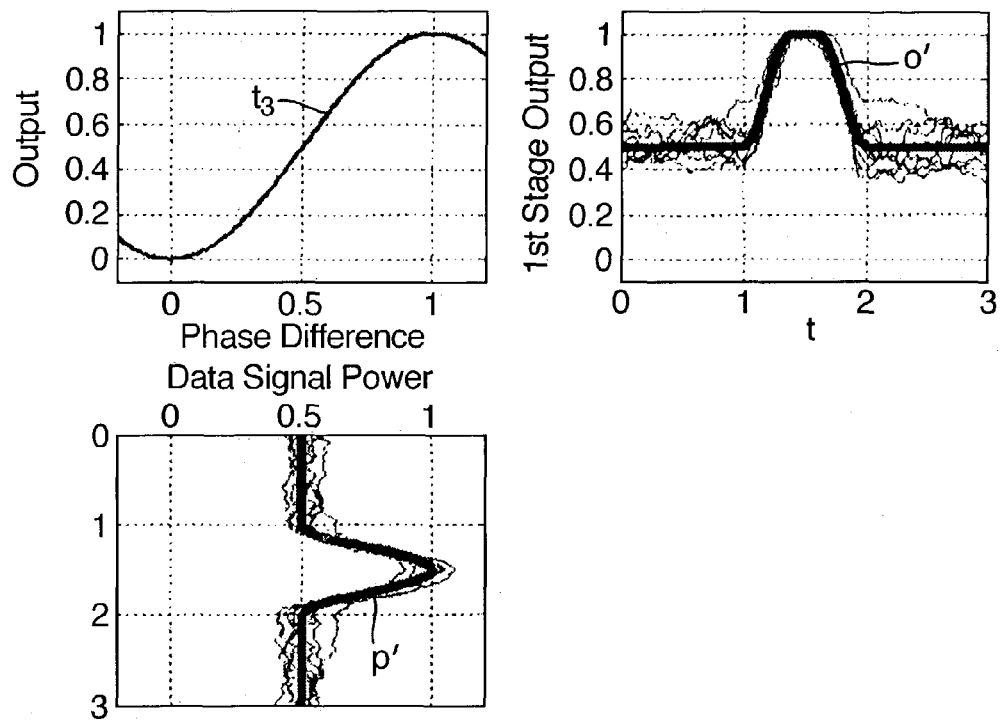
FIGS. 6c and 6d are traces of an input pulse, transfer function and output pulse through respective non-inverting stages of a regenerator according to the invention.
Figure 6D:
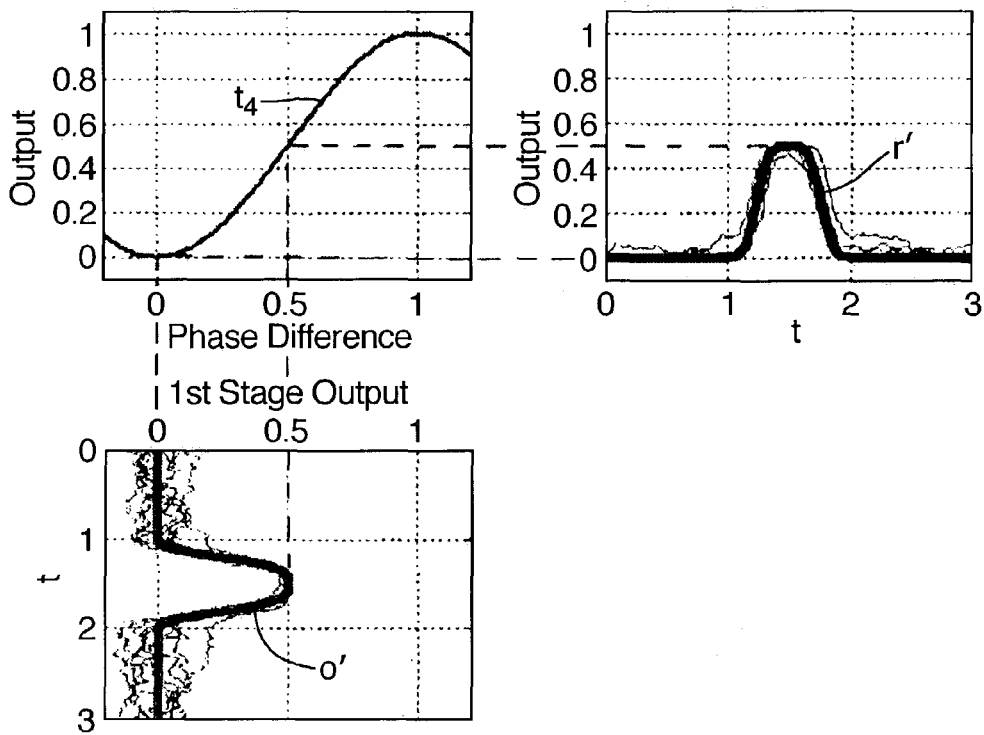

FIGS. 6c and 6d demonstrate non-inverting operation. A noisy input pulse p' induces $\pi/2$ phase difference between the arms of the interferometer due to the transfer function $t_3$. The phase offset is adjusted to obtain maximum transmission through the interferometer at the peak of the pulse, so resulting in non-inverted operation with the peak of pulse p' corresponding to the one level on the output curve o'. The noise on the input 'one' level (pulse maximum on curve p') is reduced at the output o' from the first stage because it has been aligned with a stationary point on the interferometer transfer characteristic $t_3$.

The second stage of regeneration as shown by FIG. 6d reduces the noise on the other level. The output from the first stage o' has noise on the low level, which corresponds to the input zero level (from curve p' in FIG. 6c). This level is aligned with a null of the second stage interferometer transfer characteristic $t_4$, so producing an output r' with reduced noise on the input 'zero' level. Thus, a regenerated output is produced with reduced noise on both levels.

FIG. 5 shows a second embodiment of an optical regenerator according to the invention. The first and second stages of the regenerator comprise first and second Mach-Zehnder interferometers respectively, each having a first SOA 15 in one arm, and a second SOA 11 in the other arm. Each Mach-Zehnder interferometer comprises waveguides formed on a planar substrate, with the SOAs 11 and 15, of similar construction to the SOAs 1 described above with reference to FIG. 3, also mounted on the substrate (hybrid integrated). The unswitched output from the first interferometer is coupled to a first band-pass filter 17 designed to allow transmission of signals at a wavelength $\lambda_2$ while filtering out signals at a wavelength $\lambda_1$. The transmitted signals are coupled to the second Mach-Zehnder interferometer, the unswitched output of which is coupled to a second band-pass filter 18 designed to allow transmission of signals at a wavelength $\lambda_1$ while filtering out signals at a wavelength $\lambda_2$.

With this embodiment, a first reference signal comprising a continuous wave input at wavelength $\lambda_2$ is coupled to the first interferometer while the data signal at wavelength $\lambda_1$ is split into two parts. One part is coupled so as to co-propagate with the continuous wave input through the first SOA 15, and the other part passes through a delay line 13 comprising an appropriate length of fibre, which introduces a delay of duration 6.25 ps, before being similarly coupled to the second SOA 11. Thus, cross-phase modulation from a data pulse induces a phase change in the continuous wave input passing through the second SOA 6.25 ps later than the corresponding phase change in the first SOA 15 to generate two versions of the modulated continuous wave input, one delayed with respect to the other.

Upon recombination, at the output of the first Mach-Zehnder interferometer, the two versions of the modulated CW signal interfere to generate a copy of the data signal from the 'switched' output of the interferometer, and an inverted copy of the data signal from the 'unswitched' output. The output carrying the inverted copy of the data signal is coupled to the band pass filter 17, which serves to filter out any signals at the input data signal wavelength, leaving just the partially regenerated inverted data signal at the CW wavelength.

A second reference signal comprising a continuous wave input at wavelength $\lambda_1$ is coupled to the second interferometer while the inverted copy of the data signal from the first stage of the regenerator at wavelength $\lambda_2$ is split into two parts. One part is coupled so as to co-propagate with the second continuous wave input through the first SOA 15, and the other part passes through a delay line 13 comprising an appropriate length of fibre, which introduces a delay of duration 6.25 ps, before being similarly coupled to the second SOA 11. Thus, the inverted data signal induces phase changes in the continuous wave input passing through the second SOA 6.25 ps later than the corresponding phase changes in the first SOA 15 by virtue of cross-phase modulation.

Upon recombination, at the output of the second Mach-Zehnder interferometer, the two versions of the modulated CW signal interfere to generate a copy of the inverted data signal at wavelength $\lambda_1$ from the 'switched' output of the interferometer, and an inverted copy of the inverted data signal again at wavelength $\lambda_1$ from the 'unswitched' output. The output carrying the inverted copy of the inverted data signal is coupled to the second band pass filter 18, which serves to filter out any signals at wavelength $\lambda_2$, leaving just the fully regenerated data signal at the second CW wavelength $\lambda_1$, which is also the same wavelength as the original data signal.

In the embodiments described above, the data signals and their delayed copies propagate in the same direction through the respective SOAs as the reference signals, and as they do so they induce a degree of phase modulation in the respective reference signals corresponding to the data stream transmitted by the respective SOA. For error-free operation, it is important that the phase of a pulse or discrete segment of the input signal is modulated by a single pulse or discrete segment of one of the data streams as it propagates through the SOA. In order to achieve this, each pulse or discrete segment of the input signal must clear the SOA or part thereof prior to arrival of the next pulse/segment of the data stream. This requirement will always be met if the data streams and input signals co-propagate through the SOAs, since each pulse/segment of the data stream will travel through the SOA at the same speed as a corresponding pulse/segment of the input signal. If the data streams and input signals counter-propagate through an SOA, the length of the SOA sets a severe limitation on the speed of the data stream that can be processed without incurring crosstalk from one pulse to the next.

In the embodiments described above, the first and second stages of the regenerators each use the same type of regenerator. However, it will be apparent to those skilled in the art of optical regenerator design, that an alternative embodiment could comprise one of the DISC-type regenerators used in the embodiment of FIG. 3 as a first stage and a dual-SOA regenerator as used in the embodiment of FIG. 5 as a second stage, or vice versa.

Figure 7:
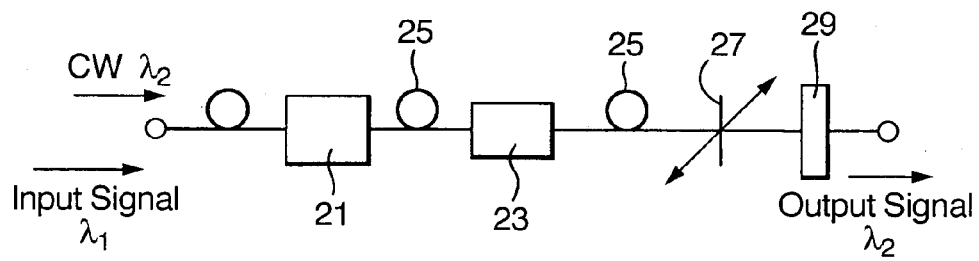
FIG. 7 is a schematic diagram of a second alternative embodiment of a single stage of a regenerator according to the invention.

Alternatively, either or both stages could comprise a variant of the DISC as shown in FIG. 7. The variant DISC comprises a single SOA 21 coupled to a first half-wave plate 25, a polarisation-dispersive element 23, a second half-wave plate 25, a polariser 27 and a band-pass filter 29, all in series. The SOA 21 and band-pass filter 29 are as described above with reference to FIG. 3. The polarisation-dispersive element 23 comprises a length of polarisation-dispersive fibre having fast and slow axes, and serves to split transmitted light into two orthogonally polarised copropagating components having the same amplitude and a delay time of 6.25 ps between them. The relative phase of the two components may be finely adjusted by the application of longitudinal strain to the fibre. The half-wave plates 25 are fibre polarisation controllers. The first is used to control the proportions of a reference signal launched into the fast and slow axes of the polarisation-dispersive fibre 23, and the second sets the polarisation states of the two components at the following polariser 27. The polariser 27 is a polarising filter with fibre connections for input and output.

The input signal and reference signal are both coupled to the SOA 21. The direction of the half-wave plates 25 and the longitudinal strain applied to the polarisation-dispersive fibre are initially determined so that, depending on whether inverted or non-inverted operation is required, the polariser 27 either blocks the interference component when no input signal pulse excites the SOA 21, or transmits the interference component when no input signal pulse excites the SOA 21. Each input signal pulse modulates the carrier density and hence refractive index of the active region of the SOA 21 due to stimulated recombination. Transmission of an input pulse therefore gives rise to a transient phase shift for the co-propagating reference signal. The phase of the reference signal is thus modulated, and is split (together with the input data signal) into two orthogonally polarised copropagating versions or components by the polarisation-dispersive element 23, one component propagating along the fast axis of the optical pathway and the other component propagating along the slow axis. Upon recombination of the two components in the polariser 27, the phase-changed fast component changes the phase difference between it and the slow component, raising the output from the polariser 27 in the case of non-inverting operation or reducing the output from the polariser 27 in the case of inverting operation. The relevant output level from the polariser 27 remains until the phase-changed slow component arrives at the polariser, at which point the phase recovery of the signal in the fast component is again matched by the phase of the signal in the slow component. The band-pass filter 29 serves to block further transmission of the input signal while allowing transmission of signals at the reference signal wavelength $\lambda_2$.

A two-stage optical regenerator according to the invention may be implemented using any combination of regenerator as described above for the first and second stages. Provided that relative phase offsets induced at the outputs of the two interferometers provide either minimum transmission from each of the interferometers by the maximum power levels of the respective input signals transmitted therethrough, or maximum transmission from the interferometer of the first stage by the maximum power level of the data signal and minimum transmission from the interferometer of the second stage by the minimum power level of the output from the first stage of the regenerator, the performance of the combined two stage regenerator can be better than that of either stage alone.

Although the first and second stages could be interchanged so that the first stage restores the 'zeros' and the second stage restores the 'ones', this would lead the second stage output to have a poor extinction ratio which would result in a severe penalty in receiver sensitivity.

The two-stage optical regenerator may be used for 2R regeneration by using a reference signal comprising a continuous wave in both stages. Alternatively, a regenerator comprising at least one stage as described with reference to FIG. 5 may be used for 3R regeneration by using a reference signal comprising a clock stream in at least one of such stages. In this case, the modulated clock stream should be made to interfere with a version thereof delayed by around 0.5 bit periods.

It will be apparent to those skilled in the art that the fundamental principles as defined by the appended claims may be applied to other regenerator embodiments not specifically described herein. Furthermore, it will be clear that various modifications to the preferred embodiments of the invention as described herein can be made without departing from the spirit or scope of the invention as defined by the appended claims.

What we claim as our invention is:

1. Two-stage optical regenerator for regenerating a data signal comprising a series of optical pulses and having a predetermined bit period, the regenerator having first and second stages each comprising:
   (i) a modulator for modulating a reference signal with an input signal; and
   (ii) an interferometer for causing the modulated reference signal to interfere with another version of the modulated reference signal delayed by less than one bit period of the data signal to regenerate the input signal;
   in which the input signal of the modulator of the first stage of the regenerator comprises the data signal, and the input signal of the modulator of the second stage of the regenerator comprises the output from the first stage of the regenerator, wherein relative phase offsets are induced at the outputs of the two interferometers of the regenerator to obtain a condition selected from:
   a. minimum transmission from each of the interferometers by the maximum power levels of the respective input signals transmitted therethrough; and
   b. maximum transmission from the interferometer of the first stage by the maximum power level of the data signal, and minimum transmission from the interferometer of the second stage by the minimum power level of the output from the first stage of the regenerator; and
   wherein the first stage of the regenerator comprises a semiconductor optical amplifier coupled to a Mach-Zehnder interferometer having a relative delay of less than one bit period of the data signal between its arms, the data signal at a first wavelength within the gain band of the semiconductor optical amplifier and the reference signal comprising a continuous wave at a second wavelength, also within the gain band of the semiconductor optical amplifier, being coupled to the semiconductor optical amplifier.

2. Optical regenerator according to claim 1, wherein the data signal propagates in the same direction as the reference signal through the semiconductor optical amplifier(s).

3. Optical regenerator according to claim 2, further comprising a band-pass filter to block transmission of the data signal at the first wavelength out of the regenerator.

4. Optical regenerator according to claim 1, wherein the data signal propagates in the opposite direction to the reference signal through the semiconductor optical amplifier(s).

5. Optical regenerator according to claim 1, wherein said second stage of the regenerator comprises a semiconductor optical amplifier coupled to a Mach-Zehnder interferometer having a relative delay of less than one bit period of the data signal between its arms, the regenerated data signal from the first stage of the regenerator at the second wavelength lying within the gain band of the semiconductor optical amplifier of the second stage, and a reference signal comprising a continuous wave at a third wavelength, also within the gain band of the semiconductor optical amplifier of the second stage, being coupled to the semiconductor optical amplifier of the second stage.

6. Optical regenerator according to claim 1, wherein said second stage of the regenerator comprises a Mach-Zehnder interferometer having a first semiconductor optical amplifier in one arm, and a second semiconductor optical amplifier in the other arm, the regenerated data signal from the first stage of the regenerator at the second wavelength lying within the gain band of the semiconductor optical amplifiers of the second stage being coupled to the first semiconductor optical amplifier of the second stage and through a delay of less than one bit period of the data signal to the second semiconductor optical amplifier of the second stage, and a reference signal comprising a continuous wave or clock stream at a third wavelength, also within the gain band of the semiconductor optical amplifiers of the second stage, being coupled to both arms of the interferometer of the second stage.

7. Optical regenerator according to claim 1, wherein said second stage of the regenerator comprises a semiconductor optical amplifier coupled in series to a polarisation-dispersive element providing a relative delay of less than one bit period of the data signal between its fast and slow axes, a polarisation controller and a polariser, the regenerated data signal from the first stage of the regenerator at the second wavelength within the gain band of the semiconductor optical amplifier of the second stage and a reference signal comprising a continuous wave at a third wavelength, also within the gain band of the semiconductor optical amplifier of the second stage, being coupled to the semiconductor optical amplifier of the second stage.

8. Optical regenerator according to claims 5, wherein the regenerated data signal from the first stage of the regenerator propagates in the opposite direction to the reference signal through the semiconductor optical amplifier(s).

9. Optical regenerator according to claim 5, wherein the third wavelength is the same as the first wavelength.

10. Optical regenerator according to claim 5, wherein the regenerated data signal from the first stage of the regenerator propagates in the same direction as the reference signal through the semiconductor optical amplifier(s).

11. Optical regenerator according to claim 10, further comprising a band-pass filter to block transmission of the regenerated data signal from the first stage of the regenerator at the third wavelength out of the regenerator.

12. Two-stage optical regenerator for regenerating a data signal comprising a series of optical pulses and having a predetermined bit period, the regenerator having first and second stages each comprising:
   (i) a modulator for modulating a reference signal with an input signal; and
   (ii) an interferometer for causing the modulated reference signal to interfere with another version of the modulated reference signal delayed by less than one bit period of the data signal to regenerate the input signal;
   in which the input signal of the modulator of the first stage of the regenerator comprises the data signal, and the input signal of the modulator of the second stage of the regenerator comprises the output from the first stage of the regenerator, wherein relative phase offsets are induced at the outputs of the two interferometers of the regenerator to obtain a condition selected from:
  a. minimum transmission from each of the interferometers by the maximum power levels of the respective input signals transmitted therethrough; and
  b. maximum transmission from the interferometer of the first stage by the maximum power level of the data signal, and minimum transmission from the interferometer of the second stage by the minimum power level of the output from the first stage of the regenerator; and
  wherein said first stage of the regenerator comprises a Mach-Zehnder interferometer having a first semiconductor optical amplifier in one arm, and a second semiconductor optical amplifier in the other arm, the data signal at a first wavelength within the gain band of the semiconductor optical amplifiers being coupled to the first semiconductor optical amplifier and through a delay of less than one bit period of the data signal to the second semiconductor optical amplifier, and the reference signal comprising a continuous wave or clock stream at a second wavelength, also within the gain band of the semiconductor optical amplifiers, being coupled to both arms of the interferometer.

13. Two-stage optical regenerator for regenerating a data signal comprising a series of optical pulses and having a predetermined bit period, the regenerator having first and second stages each comprising:
  (i) a modulator for modulating a reference signal with an input signal; and
  (ii) an interferometer for causing the modulated reference signal to interfere with another version of the modulated reference signal delayed by less than one bit period of the data signal to regenerate the input signal;
in which the input signal of the modulator of the first stage of the regenerator comprises the data signal, and the input signal of the modulator of the second stage of the regenerator comprises the output from the first stage of the regenerator, wherein relative phase offsets are induced at the outputs of the two interferometers of the regenerator to obtain a condition selected from:
  a. minimum transmission from each of the interferometers by the maximum power levels of the respective input signals transmitted therethrough; and
  b. maximum transmission from the interferometer of the first stage by the maximum power level of the data signal, and minimum transmission from the interferometer of the second stage by the minimum power level of the output from the first stage of the regenerator; and
wherein said first stage of the regenerator comprises a semiconductor optical amplifier coupled in series to a polarisation-dispersive element providing a relative delay of less than one bit period of the data signal between its fast and slow axes, a polarisation controller and a polariser, the data signal at a first wavelength within the gain band of the semiconductor optical amplifier and the reference signal comprising a continuous wave at a second wavelength, also within the gain band of the semiconductor optical amplifier, being coupled to the semiconductor optical amplifier.

* * * * *